(12) United States Patent
Peynet

(10) Patent No.: US 10,117,536 B2
(45) Date of Patent: Nov. 6, 2018

(54) AUTOMATIC DOOR CLOSING DEVICE FOR SECURE LOCKER SYSTEM

(71) Applicant: NEOPOST TECHNOLOGIES, Bagneaux (FR)

(72) Inventor: Christophe Peynet, L'Haÿ-les-Roses (FR)

(73) Assignee: NEOPOST TECHNOLOGIES, Bagneux (FR)

( * ) Notice: Subject to any disclaimer, the term of this patent is extended or adjusted under 35 U.S.C. 154(b) by 51 days.

(21) Appl. No.: 15/354,859

(22) Filed: Nov. 17, 2016

(65) Prior Publication Data
US 2017/0143145 A1 May 25, 2017

(30) Foreign Application Priority Data

Nov. 19, 2015 (EP) .................................. 15306840

(51) Int. Cl.
| | |
|---|---|
| A47G 29/14 | (2006.01) |
| G07F 17/12 | (2006.01) |
| E05F 17/00 | (2006.01) |
| E05F 15/79 | (2015.01) |
| A47G 29/30 | (2006.01) |
| G06Q 10/08 | (2012.01) |

(52) U.S. Cl.
CPC .......... *A47G 29/141* (2013.01); *A47G 29/30* (2013.01); *E05F 15/79* (2015.01); *G06Q 10/0836* (2013.01); *G07F 17/12* (2013.01); *A47G 2029/145* (2013.01); *A47G 2029/149* (2013.01); *E05F 2017/008* (2013.01)

(58) Field of Classification Search
CPC ...... A47G 29/141; A47G 29/14; A47G 29/22; E05F 15/611; E05F 15/79; E05F 17/00; E05F 2017/008; G07F 17/12; G06Q 10/0836
See application file for complete search history.

(56) References Cited

U.S. PATENT DOCUMENTS

| | | | | |
|---|---|---|---|---|
| 1,955,525 A | * | 4/1934 | Bales ................. | E05B 65/0003 292/150 |
| 4,317,604 A | * | 3/1982 | Krakauer ............... | G07F 11/54 312/125 |
| 4,836,352 A | * | 6/1989 | Tateno .................... | G07F 17/12 177/25.15 |

(Continued)

FOREIGN PATENT DOCUMENTS

| | | |
|---|---|---|
| CN | 203347414 U | 12/2013 |
| CN | 203654963 U | 6/2014 |

(Continued)

OTHER PUBLICATIONS

European Search Report, dated Mar. 7, 2016 for EP 15306840, 2 pages.

*Primary Examiner* — Justin B Rephann
(74) *Attorney, Agent, or Firm* — Cozen O'Connor

(57) ABSTRACT

An automatic built-in closing apparatus includes at least one common pivoting shaft that is driven by a unique motor, intermediate gear wheels and a clutch coupled to control doors of a series of lockable compartments pertaining to a same block of an electronic locker unit and a set of freewheels and overload clutch which is mounted on the common pivoting shaft as a hinge for each door of the series of lockable compartments.

8 Claims, 2 Drawing Sheets

(56) References Cited

U.S. PATENT DOCUMENTS

| | | | |
|---|---|---|---|
| 5,219,386 A | 6/1993 | Kletzmaier et al. | |
| 5,680,721 A * | 10/1997 | Hine, Jr. | G07F 5/18 312/139 |
| 6,502,718 B2 * | 1/2003 | Fitzgerald | G07F 5/26 221/131 |
| 6,694,217 B2 * | 2/2004 | Bloom | G06Q 20/00 700/215 |
| 7,052,097 B2 * | 5/2006 | Meek, Jr. | E05L 347/0002 312/209 |
| 7,518,068 B2 * | 4/2009 | Green | G01G 19/4144 177/144 |
| 8,197,017 B2 * | 6/2012 | Rahilly | E05B 65/0003 312/215 |
| 8,757,677 B2 | 6/2014 | Wintersteiger | |
| 2002/0156645 A1 * | 10/2002 | Hansen | G06Q 10/08 705/333 |
| 2003/0025590 A1 * | 2/2003 | Gokcebay | G06Q 40/04 340/5.73 |
| 2006/0152339 A1 * | 7/2006 | Mercier | G07F 17/12 340/5.73 |
| 2008/0121646 A1 * | 5/2008 | Schininger | G07F 11/007 221/4 |
| 2008/0128444 A1 * | 6/2008 | Schininger | E05G 1/06 221/3 |
| 2010/0026147 A1 * | 2/2010 | MacKillop | A47G 29/1201 312/215 |
| 2012/0086314 A1 * | 4/2012 | Bourke | G07F 17/10 312/109 |
| 2012/0194043 A1 * | 8/2012 | Turner | G07F 7/00 312/109 |
| 2012/0200213 A1 * | 8/2012 | Savage | E05L 31/0092 312/326 |
| 2014/0035721 A1 * | 2/2014 | Heppe | G07C 9/00912 340/5.54 |
| 2015/0077221 A1 * | 3/2015 | Peters | G07F 17/00 340/5.28 |
| 2015/0112887 A1 * | 4/2015 | Camp | G06Q 10/0836 705/339 |
| 2015/0193732 A1 * | 7/2015 | Bouzit-Benbernou | G07F 17/12 705/339 |
| 2015/0193733 A1 * | 7/2015 | Bouzit-Benbernou | A47G 29/141 705/332 |
| 2015/0379464 A1 * | 12/2015 | Turner | G07F 17/12 705/339 |
| 2016/0223388 A1 * | 8/2016 | Pointeau | G07F 17/12 |
| 2016/0292945 A1 * | 10/2016 | Waller | G07C 9/00912 |

FOREIGN PATENT DOCUMENTS

| | | |
|---|---|---|
| EP | 1087347 A2 | 3/2001 |
| EP | 2891433 A1 | 7/2015 |
| WO | 2011/036498 A2 | 3/2011 |
| WO | 2015/107569 A1 | 7/2015 |

* cited by examiner

AUTOMATIC DOOR CLOSING DEVICE FOR SECURE LOCKER SYSTEM

TECHNICAL FIELD

The present application relates to a method and apparatus for depositing by a delivery personnel or agent, shipments into an electronic locker system comprising several lockable compartments, and for retrieving these shipments thereafter. It aims in particular at an improved door closing device in an optimized control method and system for securely controlling such a modular system usually called parcel locker.

BACKGROUND

Parcel lockers which are today commonly used worldwide for dropping-off, storing and picking up various kinds of shipments such as packages and objects, generally prove convenient for most users.

For example EP 2 891 433 describes a system for securely controlling deposition and retrieval of shipments, that comprises a managing distribution centre, at least one electronic locker unit connected to the managing distribution centre through a communication network, and having several lockable compartments of different sizes, wherein said at least one electronic locker unit comprises a weighing shipment module located inside each compartment. The acts of the corresponding method executed at the electronic locker unit consist in:
- entering an identification code of the shipment and retrieving specific information associated with the shipment;
- opening a compartment of the electronic locker unit;
- depositing the shipment inside the compartment;
- weighing the shipment with a weighing module located inside the compartment and comparing in a processing module the measured weight with the weight included within the specific information; and
- locking the compartment containing the shipment and logging the compartment as being filled and locked only upon close match and validation of the comparison of the weight.

U.S. Pat. No. 5,219,386 describes a locker unit with a plurality of lockers provided with doors equipped with a locking device. The locking device consists of a mechanical lock and an auxiliary lock having an electric drive for said device. The locking device comprises a rest position which blocks the access to the mechanical lock and/or its movement, and an opening position which frees said access and/or said movement. It is thus simply achieved that the energy expenditure for activation of the closing device of the auxiliary lock can be kept very low, since the lock does not have to perform a "blocking function". In addition, it is made possible, in surprisingly simple manner, for any locker unit with any lock system to be simply equipped with the new auxiliary lock.

Similarly U.S. Pat. No. 8,757,677 relates to a lock which can be released on an electrically automated basis, in particular for use with locker-type storage systems. A lock element which can be introduced into the lock is provided, which lock element can be blocked in the lock and thus holds a locker door fixedly connected to the lock element in the closed position. A lock pawl which can be displaced in rotation to a limited degree is also provided, which engages with the lock element, either directly or indirectly via at least one displaceably mounted coupling element. The key feature of this is that the portion of a point of force transmission for the locking force transmitted to the lock pawl is designed so that a positively-induced and abutment-induced transmission of forces and pulses from the lock element or from a coupling element optionally mounted in between to the lock pawl is directed almost exclusively radially to its pivot axis and any tangential force or impulse components which occur can be transmitted almost exclusively due to frictional forces at the point of force transmission. This results in increased protection again the effects of tampering from outside.

Though all the previous locker systems generally prove satisfactory, improvements in the delivery process of items, packages, and transportable goods in general always remain a recurrent topic of close attention. Enhancing the quality of security regarding the delivery process therefore continues to be highly desirable.

As the retrieval operation entails a true public safety risk because an unauthorized or hazardous object could still be deposited in the lockable compartment during this operation of removal for committing a malevolent act, this being a major obstacle to the development of lockable storage devices in public areas. However, mostly due to cost impact issues, there is in general no automatic closure of the locker's doors, even if the lockable compartments comprise a weighing or sensing module. Even if a prompt message could incite the user to close the door upon withdrawal of the parcel, there still remains a significant number of cases in which the doors are left unlocked, totally open or insufficiently closed.

It is therefore desirable to provide a locker system which solves the above secure closing problem.

SUMMARY

An improved secure locker system for the delivery and retrieval of shipments is described herein, which actually allows or facilitates ascertaining whether an authorized or unauthorized user has deposited a suspect object in the lockable compartment during a withdrawal operation, without however unacceptably increasing the complexity and the cost of the locker system.

A secure locker system is equipped in a simple manner with a new improved closing mechanism for all lockable compartments.

According to a first aspect of the invention, these objects are achieved through the provision of a method of securely controlling the retrieval of shipments on at least an electronic locker unit connected to a managing distribution centre through a communication network, and having several lockable compartments, the method comprising the following acts executed at the electronic locker unit:
- entering identification codes of the shipment;
- opening a lockable compartment of the electronic locker unit;
- withdrawing the shipment from the lockable compartment;
- checking with a processing module and a weight or presence detector located inside the lockable compartment whether this latter is empty; and
- closing the lockable compartment and logging it as being emptied and successfully locked upon validation of no weight or presence detection, characterized in that said closing is performed automatically by an automatic built-in closing mechanism if the compartment still remains empty after a determined adjustable timeout.

This simple automatic closing act optimally fixes and protects from recurrent safety issues in the parcel locker industry.

Advantageously, said closing comprises driving independently by a motor each compartment's door via a clutch of any type (electromagnetic, gear, friction, plate, ratchet, cone . . . ).

This specific arrangement thus provides a simple control mechanism for securely closing and locking any lockable compartment.

Advantageously, said closing comprises driving by a unique motor a common pivoting shaft to simultaneously close open doors of said empty compartments, the remaining closed doors remaining closed during the rotation of said common pivoting shaft.

Preferably, said closing is performed after emitting an alert in the form of one or more of a prompt message and/or a flashing sign and/or a beep inciting the user to carry out a manual closing operation.

When the user poorly closes the door of the lockable compartment or simply forgets to do close the door in spite of the prompt message or beep, it is thus still possible to secure the locker unit with the automatic closing operation after an adjustable timeout period, adjustable for example from thirty seconds to one minute.

According to another aspect of the invention, the built-in closing mechanism comprises:
- at least one common pivoting shaft that is driven by a unique motor, intermediate gear wheels and a clutch for controlling doors of a series of lockable compartments pertaining to a same block of the electronic locker unit; and
- a set of freewheel and overload clutch which is mounted on the common pivoting shaft as a hinge for each door of the series of lockable compartments.

This mechanical arrangement allows controlling in an appropriate manner all the doors of a block of lockable compartments in various configurations with a single motorized shaft.

Preferably, the clutch is one of the following types: electromagnetic, gear, friction, plate, ratchet and cone.

According to still another aspect of the invention, an error and/or warning message is automatically transmitted to the managing distribution centre in case of any door locking failure.

Advantageously the alert message permits to remedy as soon as possible the closure failure in checking and identifying its type (lock mechanism, door damage, scale, presence sensor . . . ).

Other aspects of the invention are discussed further in the detailed description that follows.

BRIEF DESCRIPTION OF DRAWINGS

The embodiments of the invention(s) can be better understood in reading the following detailed description accompanied by illustrative and non-limiting examples with reference to the drawings, in which.

DETAILED DESCRIPTION OF PREFERRED EMBODIMENT

Figure 1:
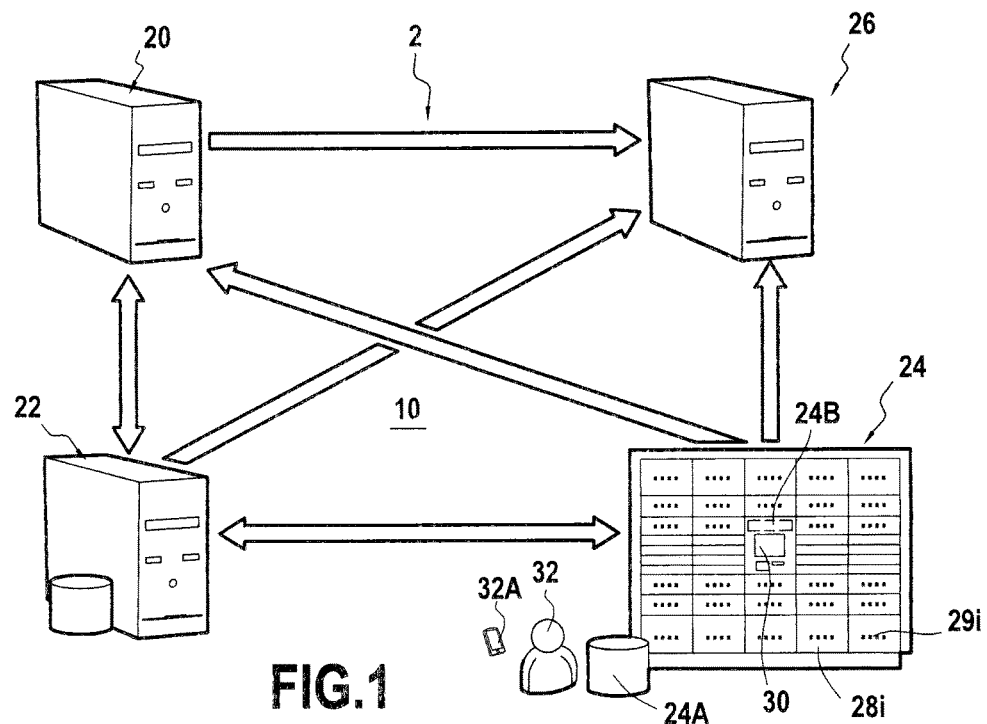
FIG. 1 schematically depicts the electronic locker system according to at least one embodiment of the invention.

In a preferred embodiment of the invention represented on FIG. 1, a secure locker system 2 comprises a communication network 10 linking at least a sender computer 20, a managing distribution centre 22, at least an electronic locker unit 24 and at least a recipient computer 26. The secure locker system is generally controlled by computer means (e.g., controller, processor) 24B associated with nontransitory computer- or processor readable media that stores information (e.g., database) 24A interfacing with electronics and mechanical structures to operate the electronic locker unit through all its input and output modes.

The electronic locker unit typically comprises a series of available compartments 28$i$ of different sizes and a set 30 of monitor, scanner and keyboard or touchscreen. Each compartment comprises an automatic door and an indicator 29$i$, for example a display or luminous sign, a light, a speaker or a buzzer. The bottom of the electronic locker unit is preferably assigned to heavy or bulky shipments. The luminous (e.g., flashing light) or audio (e.g., beep) indication is based on predefined preferences such as the closest position available to the delivery agent, and preferably at the bottom of the electronic locker unit when the shipment is determined as bulky or heavy.

Figure 2:
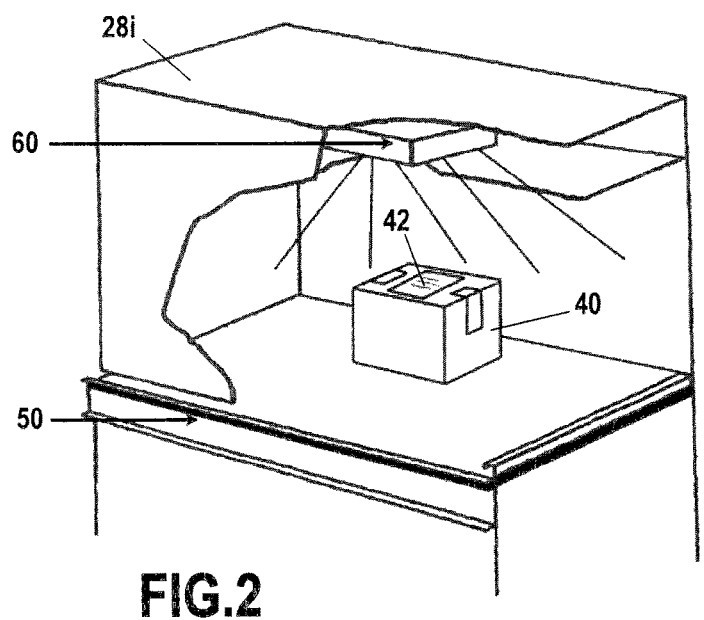
FIG. 2 is a perspective view of a compartment of an electronic locker unit in accordance with at least one embodiment of the invention.
Figure 3A:
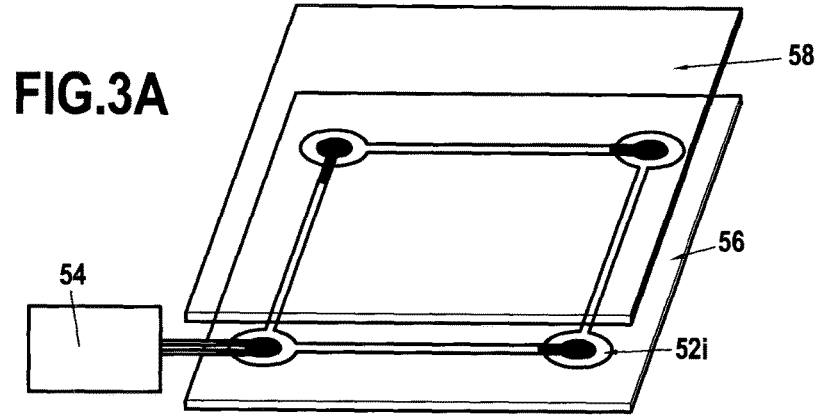
FIG. 3A and FIG. 3B are schematic top and side views of weighing means associated with the compartment of FIG. 2.
Figure 3B:
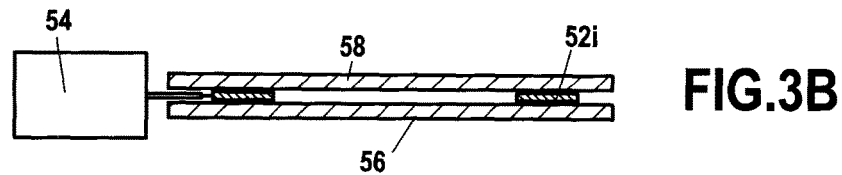

FIG. 2 illustrates a compartment for depositing a shipment such as a parcel or package 40. For tracking purposes, the parcel bears a standard identifier 42 of any kind such as a machine-readable symbol (e.g., barcode) and/or a wireless transponder (e.g., RFID tag). Each compartment comprises at least a weighing device (e.g., scale, load cell) 50. In a particular embodiment, each compartment can also comprise a presence detector 60 to detect or verify the presence or absence of the shipment. This presence detector 60 can be for instance take the form of one or more of an ultrasound emitter and sensor, infrared emitter and sensor or image acquisition device or sensor (e.g., CCD array). With this weight or presence detector located inside the compartment it is possible to know at any time whether the compartment is empty or not. As illustrated on FIGS. 3A and 3B, each weighing device comprises preferably a series of thin force sensors 52$i$ linked together to a circuit board 54, attached to a lower base 56, and located under an upper bearing plate 58.

For securely controlling the retrieval of shipments on at least an electronic locker unit 24 connected to the managing distribution centre 22 through the communication network 10, and having several lockable compartments 28$i$, the following actions are executed at the electronic locker unit: entering identification codes of the shipment 40 for instance manually via a keypad or wirelessly via a transponder or smartphone; opening a lockable compartment of the electronic locker unit; withdrawing the shipment from the lockable compartment; checking with the processing module 24B and a weight 50 or presence detector 60 located inside the lockable compartment whether this latter is empty; closing the compartment and logging the particular lockable compartment as being emptied and successfully locked upon validation of no weight or presence detection.

The identification code of the shipment is for example an unique identifier of the shipment, a code generated at the deposit and sent to the recipient or a personal password of the recipient.

According to at least one aspect of the invention, the closing of the compartment is performed automatically by an automatic built-in closing mechanism 270 if the compartment still remains empty after a determined adjustable timeout.

Figure 4:
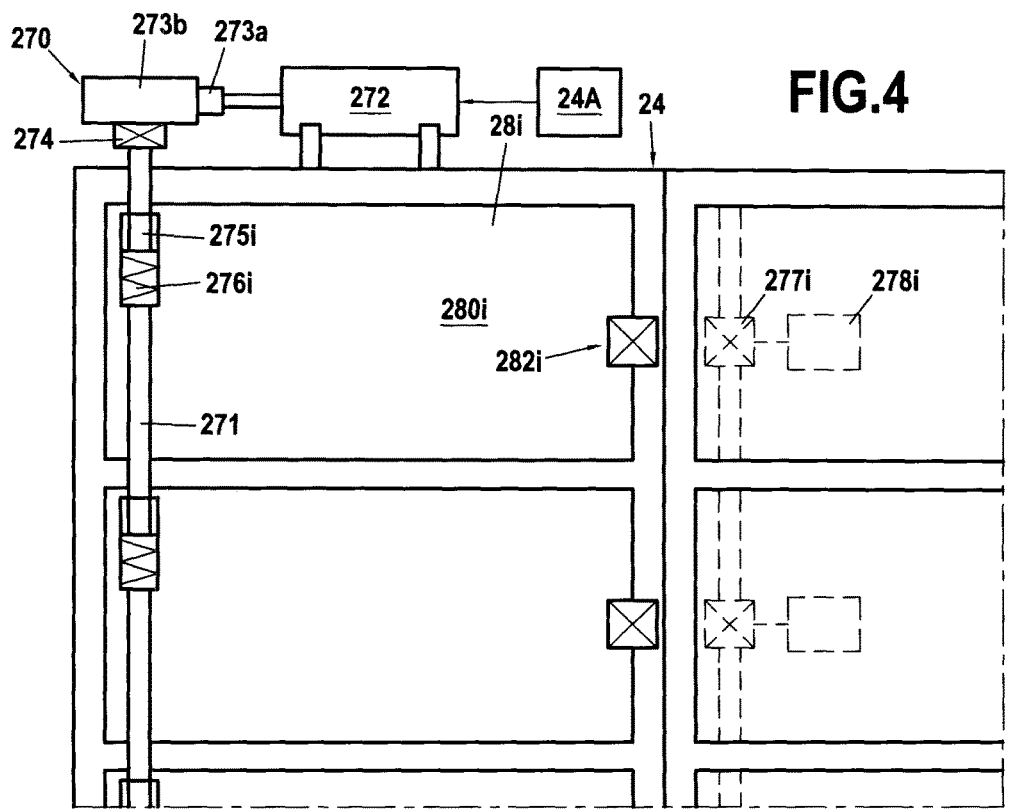
FIG. 4 schematically illustrates in broad outline the door closure device according to at least one embodiment of the invention.

As shown on FIG. 4, the automatic built-in closing mechanism 270 comprises, for example:

a common pivoting shaft 271 that is driven by a unique motor 272 and a set of intermediate gear wheels 273a, 273b and electromagnetic clutch 274 for controlling the doors 280i of a series of lockable compartments 28i pertaining to a same block of the locker unit; and a set of freewheel 275i (overrunning clutch) and overload clutch 276i (safety or slip clutch) which is mounted on the common pivoting shaft 271 as a hinge for each door 280i of the series of lockable compartments 28i.

Each lockable compartment 28i presents a door 280i that can be kept in the closed position by a conventional lock assembly 282i with a high degree of anti-tampering protection. This lock is an automated releasable locking assembly connected to the controller 24B and comprised as well known in the art and consequently not detailed here, of a lock housing, a spring-loaded lock hook or bolt, a spring-loaded lock latch, a spring-loaded lock pawl, a lock electromagnet, and position sensors.

The electronic locker unit with its door closing device operates as follows.

At a standstill, the common pivoting shaft 271 which is not driven by the motor 272, intermediate gear wheels 273a, 273b and electromagnetic clutch 274, can freely rotate. In operation the freewheel 275i can drive the associated door 280i when the common pivoting shaft 271 rotates according to the closing direction of the door. Once the door is closed and locked, if the common pivoting shaft goes on rotating, the overload clutch 276i (torque limiter) is going to slide assisting the common pivoting shaft 271 to continue rotating.

When the controller 24B of the electric locker apparatus unlocks the door 28i, the springs associated with bolt or hook, latch, pawl and electromagnet of lock 282i cooperate for automatically open the door with a forward thrust. In this door configuration, the common pivoting shaft 271 rotates freely as the electromagnetic clutch 274 is inactivated. The freewheel 275i drives the rotating common pivoting shaft while the other freewheels of the relevant series of lockable compartments behave as simple bearings. The unlocked door 280i therefore opens under the spring forward thrust.

When the user or delivery agent intends to close the door, he/she has simply to push it to the locking position. The freewheel 275i is then in the bearing mode for providing an effortless closing move.

When the user poorly closes the door of the lockable compartment or simply forgets to do it in spite of a prompt message and/or flashing sign highlighted and/or beep emitted for example through the indicator 29i, it is still possible to secure the electronic locker unit with the automatic closing operation after a determined adjustable timeout, adjustable for example from thirty seconds to one minute. Thus, when at least one door 280i remains open after retrieval of a parcel, the controller 24B starts the motor 272 that activates the electromagnetic clutch 274 and drives the common pivoting shaft 271. This shaft then rotates in the direction of closure for closing the at least one door 280i through the associated freewheel 275i which is in the blocking direction. The at least one open door which is controlled by the shaft is therefore driven to its final locking position defined by the automated releasable locking assembly 282i. When several doors are open the rotation of the common pivoting shaft 271 simultaneously closes all these open doors. The rotation of the unique motor 272 is stopped by the controller 24B when the last open door is closed (i.e., the door having the largest opening).

On the other hand, the freewheel 275i associated with a door 280i already closed is also driven by the common pivoting shaft 271 but its associated overload clutch 276i enables the rotation of the shaft without any move of the door, which remains closed. As soon as the at least one open door 280i is closed and locked, the motor 272 stops and the electromagnetic clutch 274 is disconnected from the common pivoting shaft 271 which returns to its free rotation mode.

In the embodiment described above, the automatic built-in closing mechanism 27 comprises an arrangement of a motorized shaft with a clutch of any type (e.g., electromagnetic, gear, friction, plate, ratchet, cone), freewheels and overload clutches. However, those skilled in the art will recognize from the teaching herein that another closing arrangement may comprise a set made of a motor 278i and a clutch 277i of any type (e.g., electromagnetic, gear, friction, plate, ratchet, cone) associated with each door 280i. In another not illustrated embodiment the unique motor 272 could also drive several common pivoting shafts with a set of a shared endless belt or rack and pinion (not described here), intermediate gear wheels and electromagnetic clutches.

The various embodiments described above can be combined to provide further embodiments. All of the commonly assigned US patent application publications, US patent applications, foreign patents, foreign patent applications and non-patent publications referred to in this specification and/or listed in the Application Data Sheet, including but not limited to European Patent Application No. 15306840.8, filed Nov. 19, 2015 are incorporated herein by reference, in their entirety.

The invention claimed is:

1. A method of securely controlling retrieval of a package stored in at least one of a plurality of lockable compartments of an electronic locker unit by a user, the electronic locker unit connected to a managing distribution center through a communication network, the method comprising:

entering by the user of an identification code corresponding to the package, the user entering the identification code into the electronic locker unit manually via a keypad in electronic communication with a controller of the electronic locker unit or wirelessly via at least one of a transponder coupled to the package that transmits a signal to the controller or a phone in wireless communication with the controller of the electronic locker unit;

opening by the user of a door of the at least one lockable compartment of the electronic locker unit;

withdrawing by the user of the package from the at least one lockable compartment;

checking with a processing module and a weight or presence detector located inside the at least one lockable compartment to determine whether the at least one lockable compartment is empty, the checking including the controller in electronic communication with the weight or presence detector, the controller receiving a signal from one of the weight or presence detector corresponding to the at least one lockable compartment being empty after the user withdraws the package from the at least one lockable compartment; and closing the door of the at least one lockable compartment, the closing including driving by a motor of the electronic locker unit at least one pivoting shaft common to a door of each of the plurality of lockable compartments, including the door of the at least one lockable compartment, to simultaneously close any open doors of empty at least one lockable compartments, wherein closed doors of the plurality of lockable compartments remain closed during rotation of the pivoting shaft, wherein said closing is performed automatically by the controller which activates the motor if the at least one lockable compartment remains open after a timeout period.

2. The method of claim 1, wherein said closing is performed after emitting an alert in the form of at least one of a visible message, an audible beep, or a flashing sign to prompt the user to carry out a manual closing operation.

3. The method of claim 1, further comprising: automatically transmitting an error or warning message to the managing distribution center in response to at least one door of the plurality of lockable compartments remaining open after the timeout period.

4. The method of claim 1 further comprising after closing the at least one lockable compartment:
transmitting information corresponding to the at least one lockable compartment being empty and locked to the managing distribution center.

5. The method of claim 1 wherein closing the at least one lockable compartment includes the closing performed automatically by the controller which activates the motor if the at least one lockable compartment remains open after the timeout period, wherein the timeout period is between thirty seconds and sixty seconds.

6. A closing apparatus for an electronic locker unit, comprising:
at least one pivoting shaft that is driven by a motor, gear wheels and a first clutch, the at least one pivoting shaft controlling opening and closing of each door of a series of lockable compartments of a plurality of lockable compartments of the electronic locker unit; and
a plurality of freewheel and second clutch pairs which are mounted on the pivoting shaft, each freewheel and second clutch pair operating as a hinge for a corresponding door of each of the series of lockable compartments.

7. The closing apparatus of claim 6, wherein the first clutch is one of the following types: electromagnetic, gear, friction, plate, ratchet and cone.

8. A method of securely controlling retrieval of a package stored in at least one of a plurality of lockable compartments of an electronic locker unit by a user, the electronic locker unit connected to a managing distribution center through a communication network, the method comprising:
receiving an identification code by a controller of the electronic locker unit, the identification code corresponding to the package and at least one of: entered manually via a keypad by a user or received wirelessly via a transponder coupled to the package or via a phone;
unlocking a door of the at least one lockable compartment of the electronic locker unit based on the received identification code;
checking with a processing module and a weight or presence detector located inside the at least one lockable compartment to determine whether the at least one lockable compartment is empty, the checking including the controller in electronic communication with the weight or presence detector, the controller receiving a signal from one of the weight or presence detector corresponding to the at least one lockable compartment being empty after the user withdraws the package from the at least one lockable compartment; and
closing the door of the at least one lockable compartment, the closing including driving by a motor of the electronic locker unit at least one pivoting shaft common to a door of each of the plurality of lockable compartments, including the door of the at least one lockable compartment, to simultaneously close any open doors of empty ones of the at least one lockable compartments, wherein closed doors of the plurality of lockable compartments remain closed during rotation of the pivoting shaft,
wherein said closing is performed automatically by the controller which activates the motor if the at least one lockable compartment remains open after a timeout period.

* * * * *